United States Patent
Chang et al.

(10) Patent No.: US 9,547,586 B2
(45) Date of Patent: Jan. 17, 2017

(54) METADATA CONTAINERS WITH INDIRECT POINTERS

(71) Applicant: Macronix International Co., Ltd., Hsinchu (TW)

(72) Inventors: Hung-Sheng Chang, Taipei (TW); Cheng-Yuan Wang, Taipei (TW); Hsiang-Pang Li, Zhubei (TW); Yuan-Hao Chang, Taipei (TW); Pi-Cheng Hsiu, Kaohsiung (TW); Tei-Wei Kuo, Taipei (TW)

(73) Assignee: Macronix International Co., Ltd., Hsinchu (TW)

( * ) Notice: Subject to any disclaimer, the term of this patent is extended or adjusted under 35 U.S.C. 154(b) by 307 days.

(21) Appl. No.: 13/939,948

(22) Filed: Jul. 11, 2013

(65) Prior Publication Data
US 2014/0189276 A1    Jul. 3, 2014

Related U.S. Application Data

(60) Provisional application No. 61/748,616, filed on Jan. 3, 2013.

(51) Int. Cl.
*G06F 12/00* (2006.01)
*G06F 12/02* (2006.01)
*G06F 12/10* (2016.01)

(52) U.S. Cl.
CPC ......... *G06F 12/0238* (2013.01); *G06F 12/109* (2013.01); *G06F 12/0246* (2013.01);
(Continued)

(58) Field of Classification Search
CPC ............... G06F 12/0246; G06F 12/109; G06F 2212/1032; G06F 2212/7204; G06F 2212/7211
See application file for complete search history.

(56) References Cited

U.S. PATENT DOCUMENTS 6,000,006 A * 12/1999 Bruce ................. G06F 11/1068
                                                    711/103
2003/0115439 A1* 6/2003 Mahalingam ..... G06F 17/30079
                                                    712/1
(Continued)

OTHER PUBLICATIONS

GitHub, Swapping elements in double linked-list, May 7, 2012, https://gist.github.com/badboy/2630183.*

*Primary Examiner* — Kalpit Parikh
(74) *Attorney, Agent, or Firm* — Yiding Wu; Haynes Beffel & Wolfeld LLP

(57) ABSTRACT

A method is provided for managing a file system including data objects. The data objects, indirect pointers and source pointers are stored in containers that have addresses and include addressable units of a memory. The objects are mapped to addresses for corresponding containers. The indirect pointer in a particular container points to the address of a container in which the corresponding object is stored. The source pointer in the particular container points to the address of the container to which the object in the particular container is mapped. An object in a first container is moved to a second container. The source pointer in the first container is used to find a third container to which the object is mapped. The indirect pointer in the third container is updated to point to the second container. The source pointer in the second container is updated to point to the third container.

11 Claims, 8 Drawing Sheets

(52) U.S. Cl.
CPC ............ *G06F 2212/1032* (2013.01); *G06F 2212/7204* (2013.01); *G06F 2212/7211* (2013.01)

(56) References Cited

U.S. PATENT DOCUMENTS

| | | | |
|---|---|---|---|
| 2007/0150689 A1* | 6/2007 | Pandit et al. ................. | 711/170 |
| 2008/0172563 A1* | 7/2008 | Stokes .................... | G06F 21/80 |
| | | | 713/193 |
| 2009/0276470 A1* | 11/2009 | Vijayarajan et al. ......... | 707/202 |
| 2015/0143021 A1* | 5/2015 | Bruso ................. | G06F 12/0246 |
| | | | 711/103 |

* cited by examiner

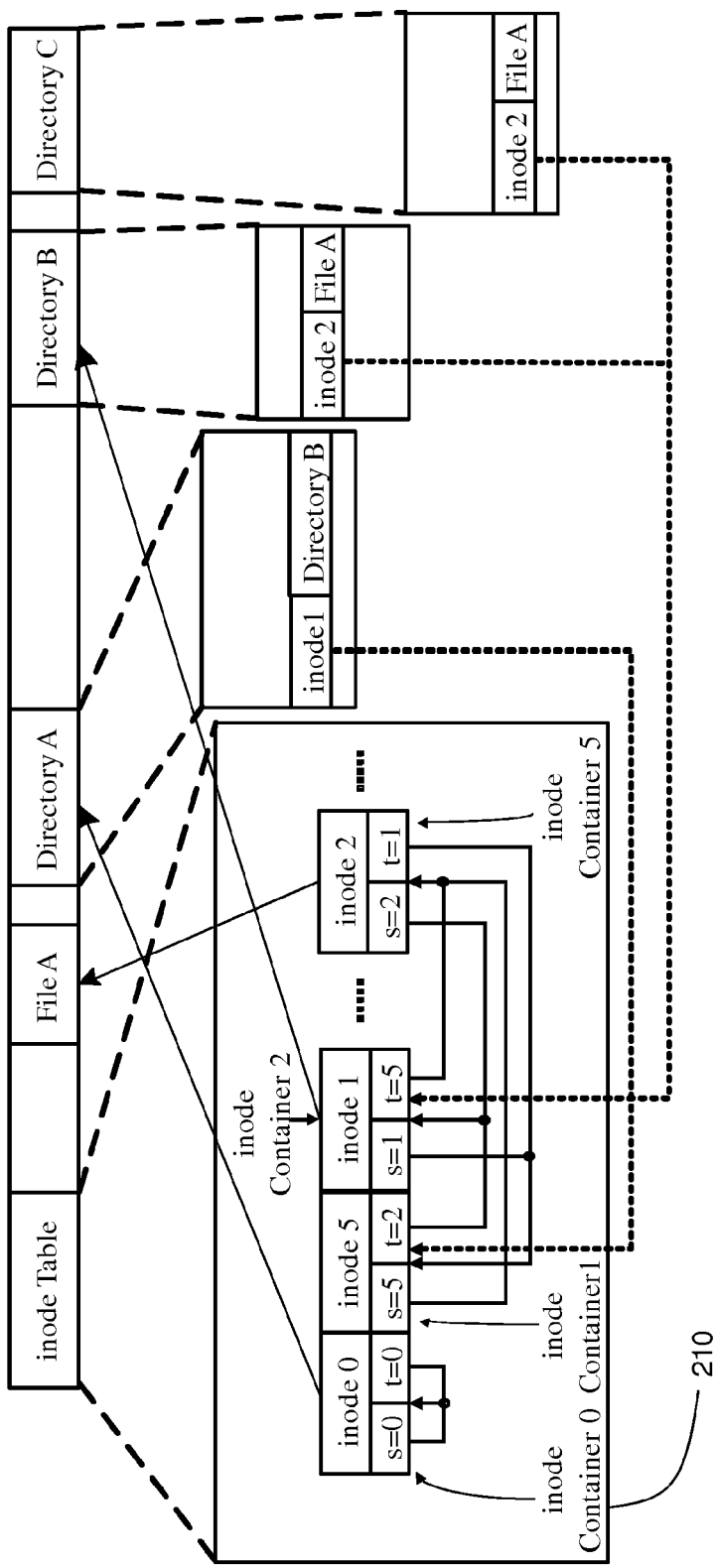
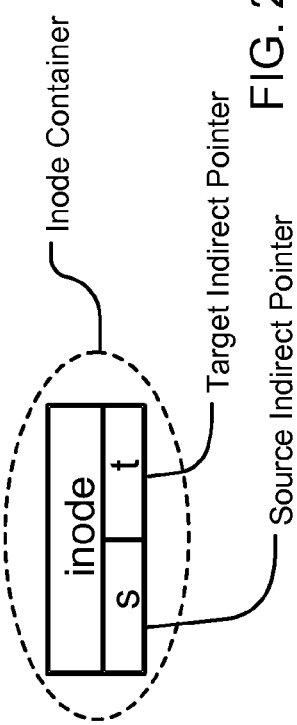
FIG. 2A
FIG. 2B

Updating Indirect Target Pointers

METADATA CONTAINERS WITH INDIRECT POINTERS

RELATED APPLICATIONS

This application claims the benefit of U.S. Provisional Patent Application No. 61/748,616 filed on 3 Jan. 2013, which application is incorporated by reference as if fully set forth herein.

BACKGROUND OF THE INVENTION

Field of the Invention

The present invention relates to memory devices and systems including memory management.

Description of Related Art

Nonvolatile memory has write/erase endurance limitations. Without memory management with regard to write/erase endurance limitations, the memory may wear out prematurely or even cause system failure. Wear leveling for memory management is an approach to increase endurance of nonvolatile memory. Implementation of an effective wear leveling algorithm may consume memory space, increase operating complexity, and cause system overhead and latency. Therefore, it is important to balance the trade-offs between low latency and effective wear leveling. Write/erase endurance limitations for nonvolatile memory such as phase change material based memory can be about $10^6$-$10^9$, lower than those of dynamic random access memories (DRAM) which can be more than $10^{15}$. Consequently, it can be more important to have effective wear leveling algorithms for nonvolatile memory to be used in high endurance environments like those normally limited to DRAM. Particularly, metadata including inodes used in file systems to maintain attributes for files and directories is frequently updated so that metadata can experience the endurance problem of nonvolatile memory.

It is desirable to provide an effective wear leveling design that has low computational complexity and low latency, and that can be compatible with existing virtual addressing schemes used for memory management.

SUMMARY

Technology is described that supports storage of data objects that are updated relatively often, in non-volatile memory having limited endurance, such as phase change memory, or in other memory types in which data is moved by memory management processes that may be independent of the character of the data object.

A system using the technology can include logic for finding a particular object according to the mapping of the objects to addresses for corresponding containers and indirect pointers, and using the indirect pointer (e.g. target pointer) to access the particular object. The objects can be moved among the containers in the plurality of containers according to usage patterns in the memory (e.g. wear leveling) without changing the mapping.

For example, a method for memory management, is described that includes storing data objects in a plurality of containers having addresses and that comprise addressable units of a physical memory; using indirect pointers to access the data objects, the indirect pointer in a particular container pointing to the address of a container in the plurality of containers in which the corresponding data object is stored; and moving the data objects and updating the indirect pointers according to a wear leveling protocol for the physical memory. The indirect pointers can be stored in the same physical memory as the containers. Also, the indirect pointers can be stored in the containers.

In one example described herein, a method for memory management for a file system including a plurality of data objects comprises storing the data objects (e.g. inodes) in a plurality of containers that have addresses and include addressable units of a memory, mapping the objects (e.g. inodes) to addresses for corresponding containers in the plurality of containers, and storing indirect pointers (e.g. target pointers) in the containers. The indirect pointer in a particular container points to the address of a container in the plurality of containers in which the corresponding object is stored. The method includes storing source pointers in the containers. The source pointer in the particular container points to the address of the container in the plurality of containers to which the object stored in the particular container is mapped.

The method includes moving an object stored in a first one of the containers to a second one of the containers, and using the source pointer in the first one to find a third one to which the object is mapped. The method includes updating the indirect pointer in the third one to point to the second one, and updating the source pointer in the second one to point to the third one. The movement of the data object may be a product of wear leveling in the memory, or other memory management technique unrelated to the nature of the data object.

The method can include swapping a first data object stored in a first one of the containers with a second data object stored in a second one of the containers, where the first data object is mapped to a third one of the containers and the second data object is mapped to a fourth one of the containers. The swapping operation can correspond for example to a movement of one object from a physical location in the memory that has a higher access count, to a physical location that has a lower access count, and of the object stored in the lower access count location to the higher access count location, to improve wear leveling. The swapping method in this example includes using the source pointer in the first one to find the third one, and using the source pointer in the second one to find the fourth one. The method includes updating the indirect pointer in the third one to point to the container that is pointed to by the indirect pointer of the fourth one, and updating the indirect pointer in the fourth one to point to the container that was pointed to by the indirect pointer of the third one before the indirect pointer of the third one is updated. The method includes updating the source pointer in the second one to point to the third one, and updating the source pointer in the first one to point to the fourth one. In case indirect pointers and/or source pointers point to the containers that store the indirect pointers and/or source pointers, the third one of the containers and/or the fourth one of the containers can be the same as the first one of the containers and/or the second one of the containers.

The use of phase change memory for storage of data objects, like inodes, can be beneficial because of the high access speeds possible which enable real time reads and writes, along with the non-volatile nature of phase change memory, which may enable faster recovery from loss of power or other reset events. It is important for systems including memory management to complete atomic operations such as updating metadata of file systems including indirect pointers as described herein. Systems utilizing backup power (e.g. a supercapacitor) can help ensure that such atomic operations can complete and consequently the systems can recover from loss of power without loss of data including the indirect pointers.

Other aspects and advantages of the present invention can be seen on review of the drawings, the detailed description and the claims, which follow.

BRIEF DESCRIPTION OF THE DRAWINGS

FIG. 2A illustrates an inode container.

FIG. 2B illustrates example relationship between inodes stored in inode containers and respective files and directories represented by inodes.

DETAILED DESCRIPTION

A detailed description of embodiments of the metadata container technology using indirect pointers is provided with reference to the Figures.

Figure 1:
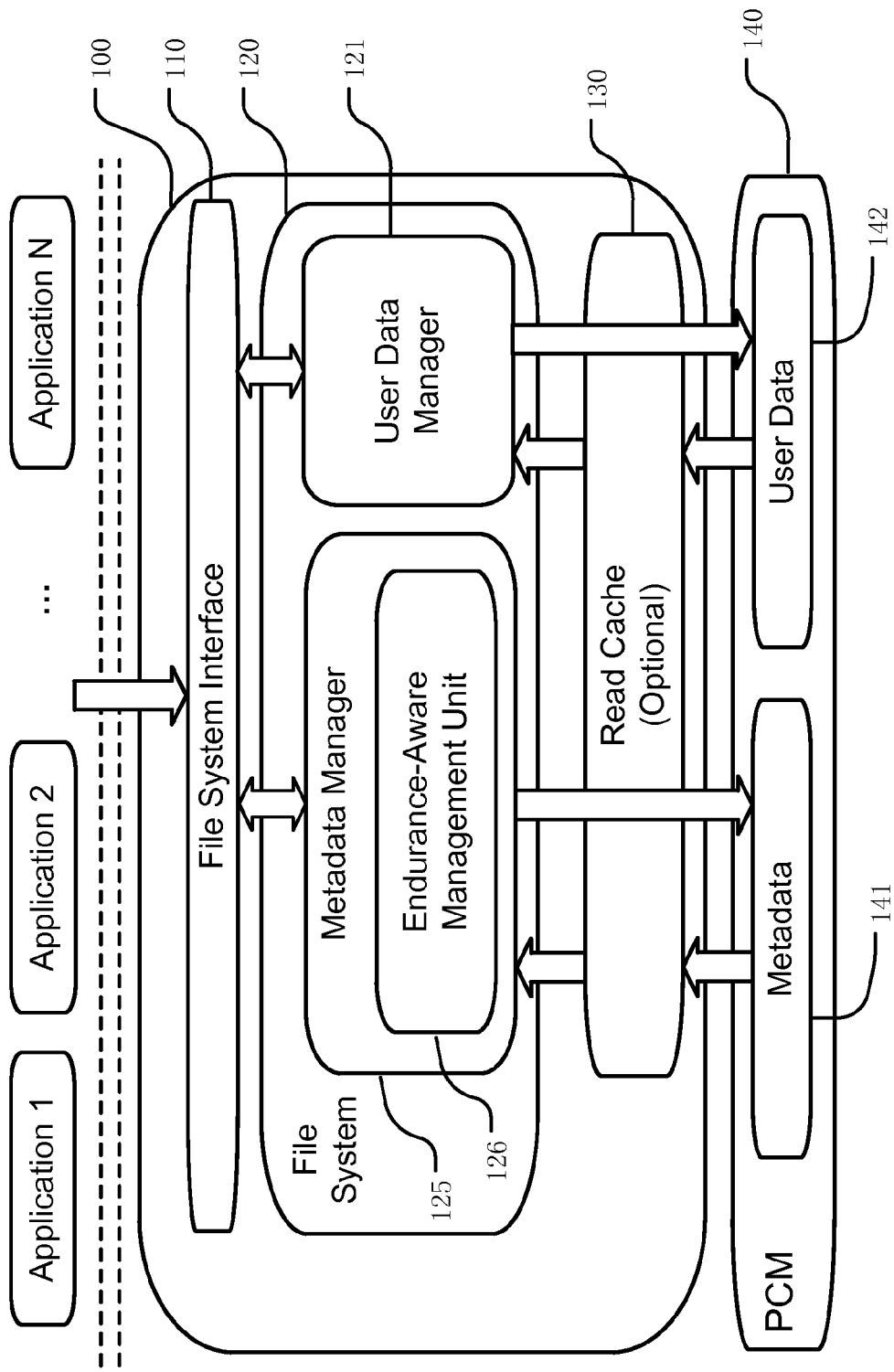
FIG. 1 is a block diagram of an example memory management system.

FIG. 1 is a block diagram of an example memory management system 100 using a method for memory management for a file system including data objects such as files, directories, links, etc. The memory management system includes a file system interface 110 between with user processes such as Application 1, Application 2, Application N and file system 120. File system 120 includes a user data manager 121 and a metadata manager 125. The file system 120 stores metadata 141 and user data 142 in phase change memory (PCM) 140. There can be a read cache 130 coupled between the file system 120 and the phase change memory 140.

When the file system interface 110 receives an input/output (I/O) request from a user process, it dispatches the request to the user data manager 121 in the file system 120 if the request is to access user data. Likewise, the file system interface 110 dispatches the request to the metadata manager 125 in the file system 120 if the request is to access metadata. The metadata manager 125 processes metadata, and includes an endurance-aware management unit 126 to prevent frequently updated metadata from wearing out PCM memory cells.

Metadata in a file system can include inodes (i.e. index nodes) that provide information about attributes of data objects such as files and directories. A file or a directory can be represented by an inode. For instance, an inode can include such information as time and date when a file is created or modified, the author that creates the file, location where the file is created, size of the file, etc, but does not include the user data in the file. Thus size of an inode can be relatively small, for example, such as 128 bytes or 256 bytes. Modes are linked to memory locations that actually contain the user data.

FIG. 2A illustrates an inode container that stores an inode, an indirect target pointer t, and an indirect source pointer s. An inode container can be referred to as a container. An indirect target pointer can be referred to as an indirect pointer. An indirect source pointer can be referred to as a source pointer.

FIG. 2B illustrates relationship between inodes (i.e. index nodes) stored in inode containers and respective files and directories represented by inodes. For example, inodes 0, 1, and 2 provide information about attributes of Directory A, Directory B, and File A, respectively. To access the user data in a file (e.g. File A), the file system (e.g. 120, FIG. 1) needs to access the inode corresponding to the file (e.g. inode 2).

Data objects (e.g. inodes 0, 1, 2, 5) are stored in a plurality of containers (i.e. inode containers 0, 1, 2, 5) in an inode area 210. The containers have addresses and include addressable units of a memory. The inode area 210 can be in a PCM memory. Data objects (e.g. inodes 0, 1, 2, 5) in the containers (e.g. inode containers 0, 1, 2, 5) are mapped to addresses for corresponding containers in the plurality of containers. For instance, inodes 0, 1, 2, 5 are mapped to inode containers 0, 1, 2, 5, respectively, before any inodes are moved among the inode containers in the plurality of containers, for example according to usage patterns in the memory for purposes of memory management such as wear leveling.

Indirect target pointers (e.g. t=0, t=2, t=5, t=1) are stored in the inode containers (e.g. inode containers 0, 1, 2, 5). An indirect target pointer t in a particular container points to the address of a container in the plurality of containers in which the corresponding object is stored. For example, the indirect target pointer t in a particular inode container 2 points to the address of inode container 5 in which the inode corresponding to inode container 2 is stored. For example, the indirect target pointer t in the particular inode container 1 points to the address of inode container 2 in which the inode corresponding to inode container 1 is stored.

Indirect source pointers (e.g. s=0, s=5, s=1, s=2) are stored in the inode containers (e.g. inode containers 0, 1, 2, 5). An indirect source pointer s in a particular container points to the address of a container in the plurality of containers to which the object stored in the particular container is mapped. For example, the indirect source pointer s in the particular inode container 2 points to the address of inode container 1 to which the inode 1 stored in the particular inode container 2 is mapped. For example, the indirect source pointer s in the particular inode container 1 points to the address of inode container 5 to which the inode 5 stored in the particular inode container 1 is mapped.

A particular data object can be found by accessing the corresponding container according to the mapping of the objects to addresses for corresponding containers, and reading the indirect target pointer to access the particular object. For example, a particular data object inode 2 can be found by accessing the corresponding container (e.g. inode container 2) according to the mapping, and reading the indirect target pointer (e.g. t=5) to access the particular object inode 2 stored in inode container 5. For example, a particular data object inode 5 can be found by accessing the corresponding container (e.g. inode container 5) according to the mapping, and reading the indirect target pointer (e.g. t=1) to access the particular object inode 5 stored in inode container 1.

Thus, the file system (e.g. 120, FIG. 1) can access any particular inode by looking up only one indirect target pointer in an inode container corresponding to the particular inode, regardless of how many data objects are stored in the file system, or how many times the particular inode is moved among the inode containers in the plurality of containers.

Data objects (e.g. inodes) can be moved among the containers in the plurality of containers according to usage patterns in the memory (e.g. wear leveling) without changing the mapping of the data objects (e.g. inodes) to addresses for corresponding containers. As illustrated in FIG. 2B, although inodes have been moved among the containers such that inode 5 is not stored in inode container 5 but in inode container 1, and inode 1 is not stored in inode container 1 but in inode container 2, the file system can still access any particular inode by looking up only one indirect target pointer.

Figure 3:
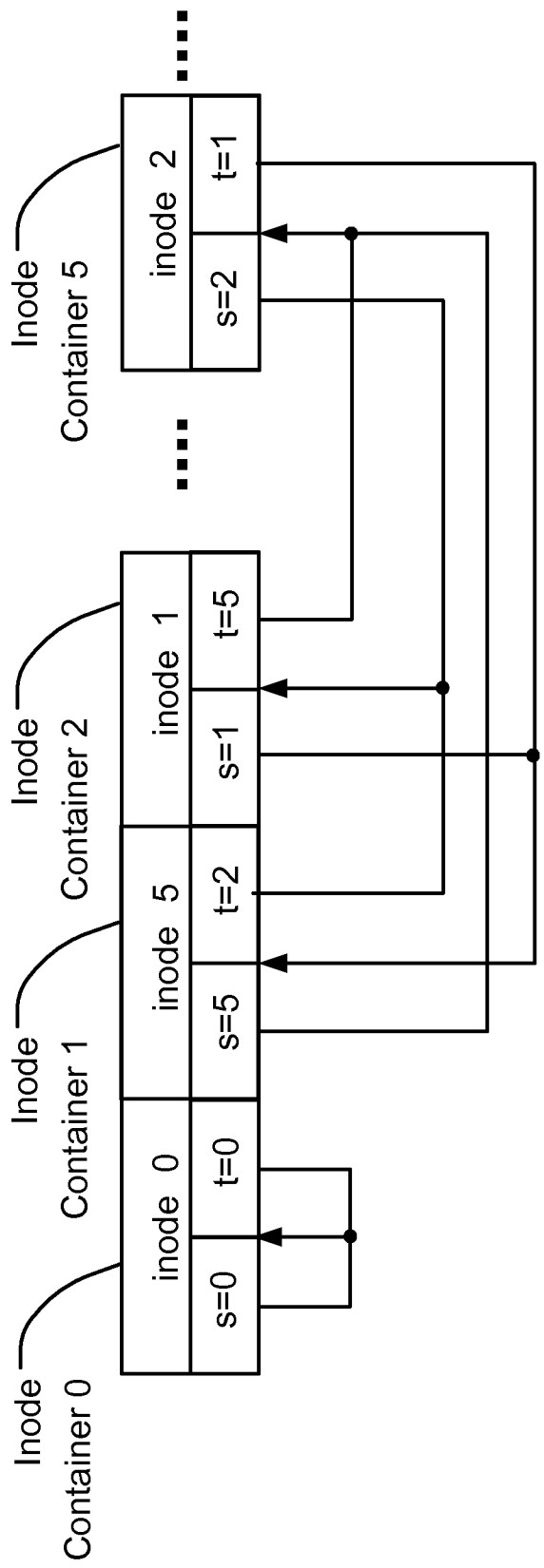
FIG. 3 illustrates example states of inodes before they are moved among inode containers.

FIG. 3 corresponds to the inode area 210 in FIG. 2B, and illustrates example states of inodes before they are moved or swapped among inode containers as explained in connection with FIG. 4 and FIG. 5. In particular, Mode container 0 stores a data object (e.g. inode 0), and a source pointer s and a target pointer t both pointing to the address of the inode container 0. Mode container 1 stores a data object (e.g. inode 5), a source pointer s pointing to the address of inode container 5 to which the object (e.g. inode 5) stored in the inode container 1 is mapped, and a target pointer t pointing to the address of inode container 2 in which the corresponding object (e.g. inode 1) is stored. Inode container 5 stores a data object (e.g. inode 2), a source pointer s pointing to the address of inode container 2 to which the object (e.g. inode 2) stored in the inode container 5 is mapped, and a target pointer t pointing to the address of inode container 1 in which the corresponding object (e.g. inode 5) is stored.

Objects (e.g. inodes) are moved or swapped among containers according to usage patterns in the memory (e.g. wear leveling). To ensure that after objects are moved or swapped, the file system (e.g. 120, FIG. 1) can find a particular object by accessing the corresponding container and reading the indirect target pointer to access the particular object, source pointers and target pointers in the inode containers are updated when inodes are moved or swapped.

Figure 4:
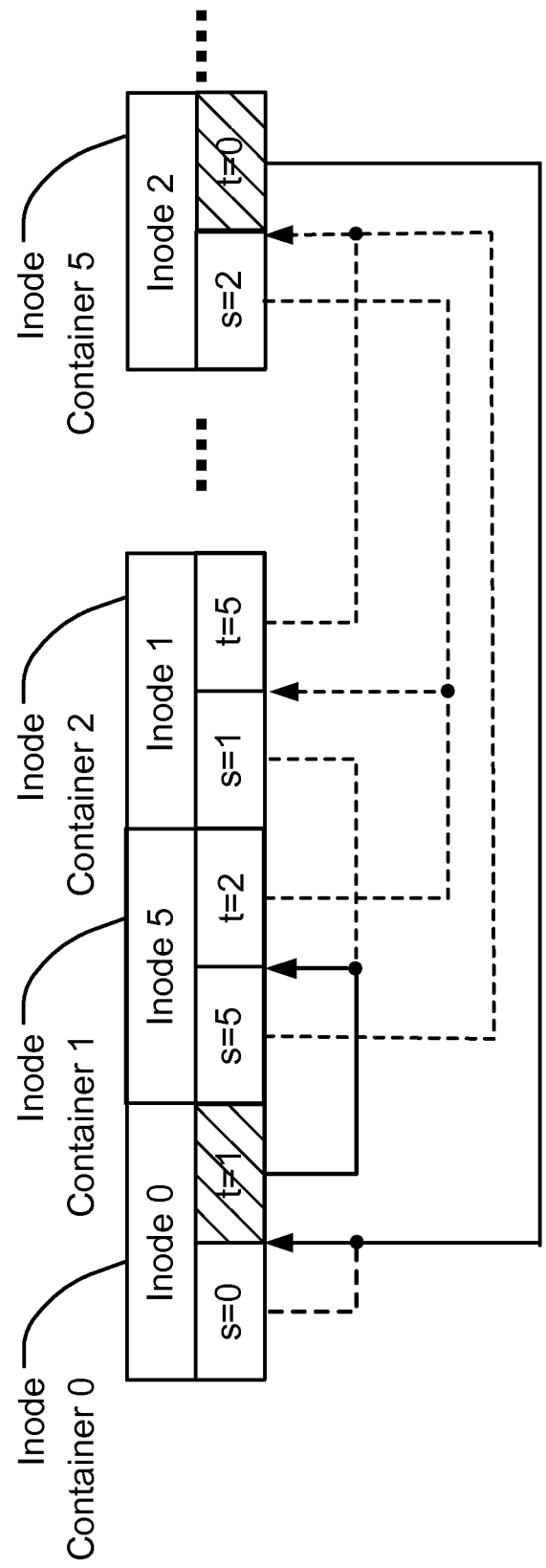
FIG. 4 illustrates updating indirect target pointers.

FIG. 4 illustrates updating indirect target pointers. A first data object (e.g. inode 5) stored in a first container (e.g. inode container 1) are to be swapped with a second data object (e.g. inode 0) stored in a second container (e.g. inode container 0). The first data object (e.g. inode 5) is mapped to a third container (e.g. inode container 5), and the second data object (e.g. inode 0) is mapped to a fourth container (e.g. inode container 0). In this example, the second container and the fourth container both refer to inode container 0, because the indirect source pointer s in inode container 0 points back to inode container 0. In general, the second container and the fourth container can refer to different containers. The indirect source pointer s in the first container (e.g. inode container 1) is used to find the third container (e.g. inode container 5). The indirect source pointer s in the second container to find the second or fourth container (e.g. inode container 0).

The indirect target pointer t in the third container (e.g. inode container 5) is updated to point to the container that is pointed to by the indirect target pointer t of the fourth container (e.g. inode container 0). The indirect target pointer t in the fourth container (e.g. inode container 0) is updated to point to the container that was pointed to by the indirect target pointer t of the third container before the indirect target pointer t of the third container is updated (e.g. inode container 1).

Figure 5:
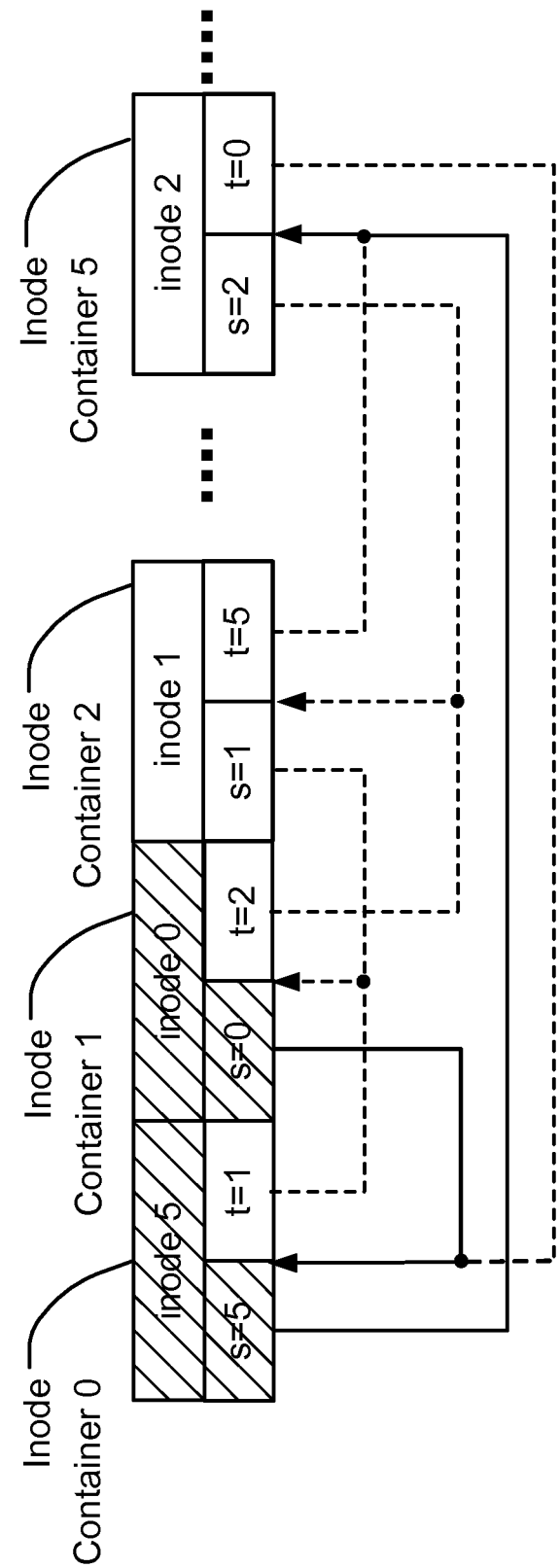
FIG. 5 illustrates swapping inodes and updating indirect source pointers.

FIG. 5 illustrates swapping inodes and updating indirect source pointers. A first data object (e.g. inode 5) stored in a first container (e.g. inode container 1) is swapped with a second data object (e.g. inode 0) stored in a second container (e.g. inode container 0). The indirect source pointer s in the second container (e.g. inode container 0) is updated to point to the third container (e.g. inode container 5), and the indirect source pointer s in the first container (e.g. inode container 1) is updated to point to the fourth container (e.g. inode container 0), which is also referred to as the second container in this example.

Swapping a first data object (e.g. inode 5) stored in a first container (e.g. inode container 1) with a second data object (e.g. inode 0) stored in a second container (e.g. inode container 0) results in having the first data object stored in the second container and the second data object stored in the first container. For instance, swapping can be done by moving the second data object stored in the second container to a temporary storage space, moving the first data object stored in the first container to the second container, and then moving the second data object from the temporary storage space to the first container.

As illustrated in FIGS. 3, 4 and 5, inodes 0 and 5 initially stored in inode containers 0 and 1 are swapped after the target pointers are updated. Alternatively, inodes 0 and 5 initially stored in inode containers 0 and 1 can be swapped before the target pointers are updated.

In one embodiment, Algorithm 1 describes a method for memory management for a file system including a plurality of data objects. Pseudocode for Algorithm 1 is reproduced below:

1: xstmp=x.s;
2: ystmp=y.s;
3: swap (xstmp.t, ystmp.t);
4: swap (x.s, y.$);
5: swap (x.inode, y.inode);

In Algorithm 1, x and y represent first and second inode containers in a plurality of inode containers, x.s and y.s represent indirect source pointers in the first and second inode containers x and y, and x.inode and y.inode represent inodes stored in the first and second inode containers x and y. Indirect source pointers x.s and y.s point to third and fourth inode containers xstemp and ystemp. Third and fourth inode containers xstemp and ystemp store indirect target pointers xstemp.t and ystemp.t. Function swap 0 represents a function that swaps two arguments given to the function. For instance, the two arguments can be two indirect target pointers, two indirect source pointers, or two inodes.

On line 1 of Algorithm 1, a third inode container xstemp is found by using the indirect source pointer x.s in the first inode container x. On line 2, a fourth inode container ystmp is found by using the indirect source pointer y.s in the second inode container y.

On line 3, indirect target pointers xstmp.t and ystmp.t stored in the third and fourth inode containers are swapped. On line 4, indirect source pointers x.s and y.s stored in the first and second inode containers are swapped. On line 5, inodes stored in the first and second inode containers are swapped.

In alternative embodiments, the swapping of inodes on line 5 can be executed before the swapping of indirect source pointers on line 4, or before the swapping of indirect target pointers on line 3.

Figure 6:
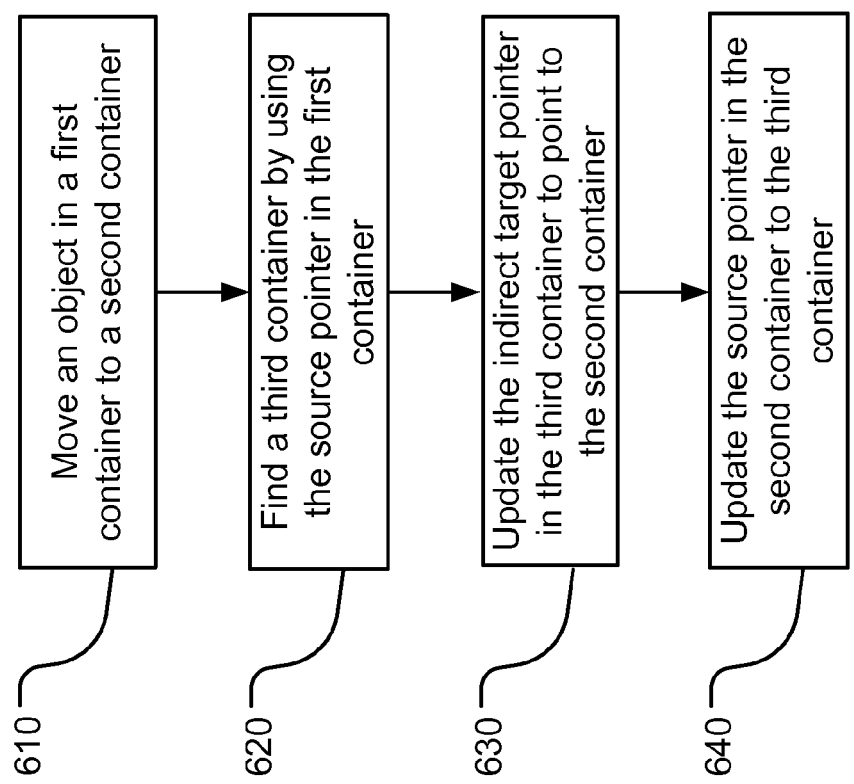
FIG. 6 is a flow chart for memory management using inode containers with indirect pointers.

FIG. 6 is a flow chart for memory management using inode containers with indirect pointers. At Step 610, an object (e.g. inode 5, FIG. 4) stored in a first container (e.g. inode container 1, FIG. 4) is moved to a second container (e.g. inode container 0, FIG. 5). At Step 620, a third container (e.g. inode container 5, FIG. 4) is found by using the indirect source pointer in the first container (e.g. inode container 1, FIG. 4). At Step 630, the indirect target pointer in the third container (e.g. inode container 5, FIG. 5) is updated to point to the second container (e.g. inode container 0, FIG. 5). At Step 640, the indirect source pointer in the second container (e.g. inode container 0, FIG. 5) is updated to the third container (e.g. inode container 5, FIG. 5). In alternative embodiments, Step 610 can be executed between Steps 630 and 640, or after Step 640.

Figure 7:
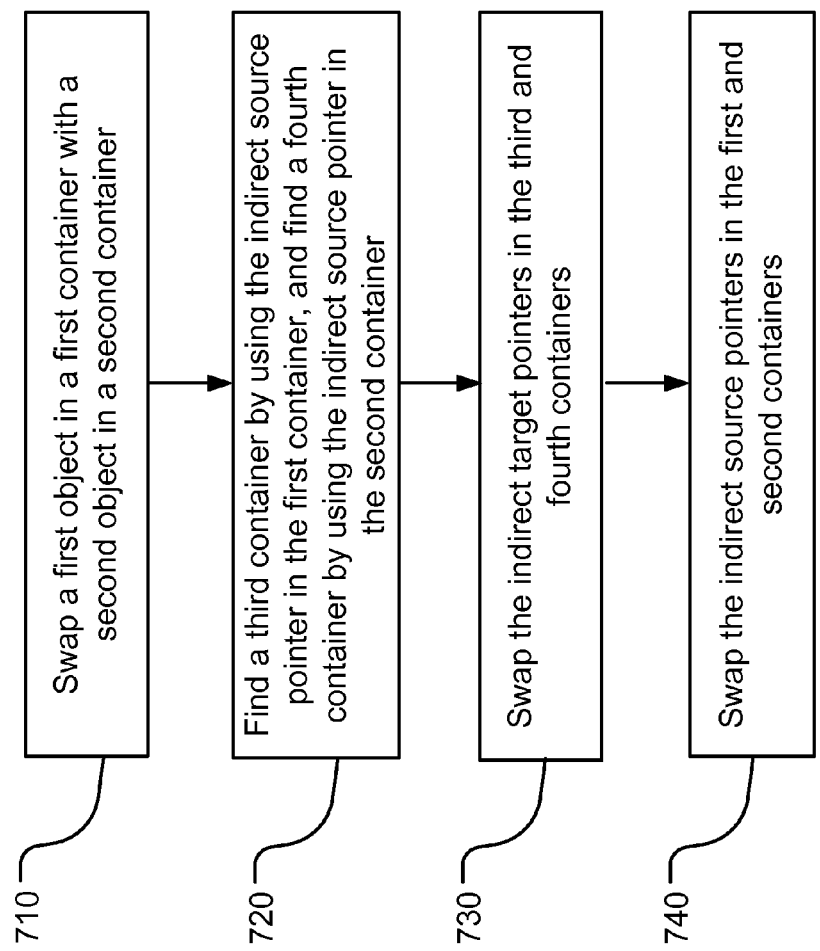
FIG. 7 is an alternative flow chart for memory management using inode containers with indirect pointers.

FIG. 7 is an alternative flow chart for memory management using inode containers with indirect pointers. At Step 710, a first data object (e.g. inode 5) stored in a first container (e.g. inode container 1) is swapped with a second data object (e.g. inode 0) in a second container (e.g. inode container 0), as illustrated in FIGS. 4 and 5. At Step 720, a third container (e.g. inode container 5) is found by using the indirect source pointer in the first container (e.g. inode container 1), and a fourth container (e.g. inode container 0) is found by using the indirect source pointer in the second container (e.g. inode container 0), as illustrated in FIG. 3. In this example, the second container and the fourth container both refer to inode container 0, because the indirect source pointer s in inode container 0 points back to inode container 0. In general, the second container and the fourth container can refer to different containers.

At Step 730, the indirect target pointers (e.g. t=1 and t=0) in the third and fourth containers (e.g. inode containers 5 and 0) are swapped, as illustrated in FIGS. 3 and 4. The indirect target pointers can be swapped by updating the indirect target pointer t in the third container (e.g. inode container 5) to point to the container that is pointed to by the indirect target pointer t of the fourth container (e.g. inode container 0), and by updating the indirect target pointer t in the fourth container (e.g. inode container 0) to point to the container that was pointed to by the indirect target pointer t of the third container before the indirect target pointer t of the third container is updated (e.g. inode container 1).

At Step 740, the indirect source pointers (e.g. s=0 and s=5) in the first and second containers (e.g. inode containers 0 and 1) are swapped, as illustrated in FIGS. 4-5. The indirect source pointers can be swapped by updating the indirect source pointer s in the second container (e.g. inode container 0) to point to the third container (e.g. inode container 5), and by updating the indirect source pointer s in the first container (e.g. inode container 0) to point to the fourth container (e.g. inode container 0), which is also referred to as the second container in this example.

In alternative embodiments, Step 710 can be executed between Steps 730 and 740, or after Step 740.

Figure 8:
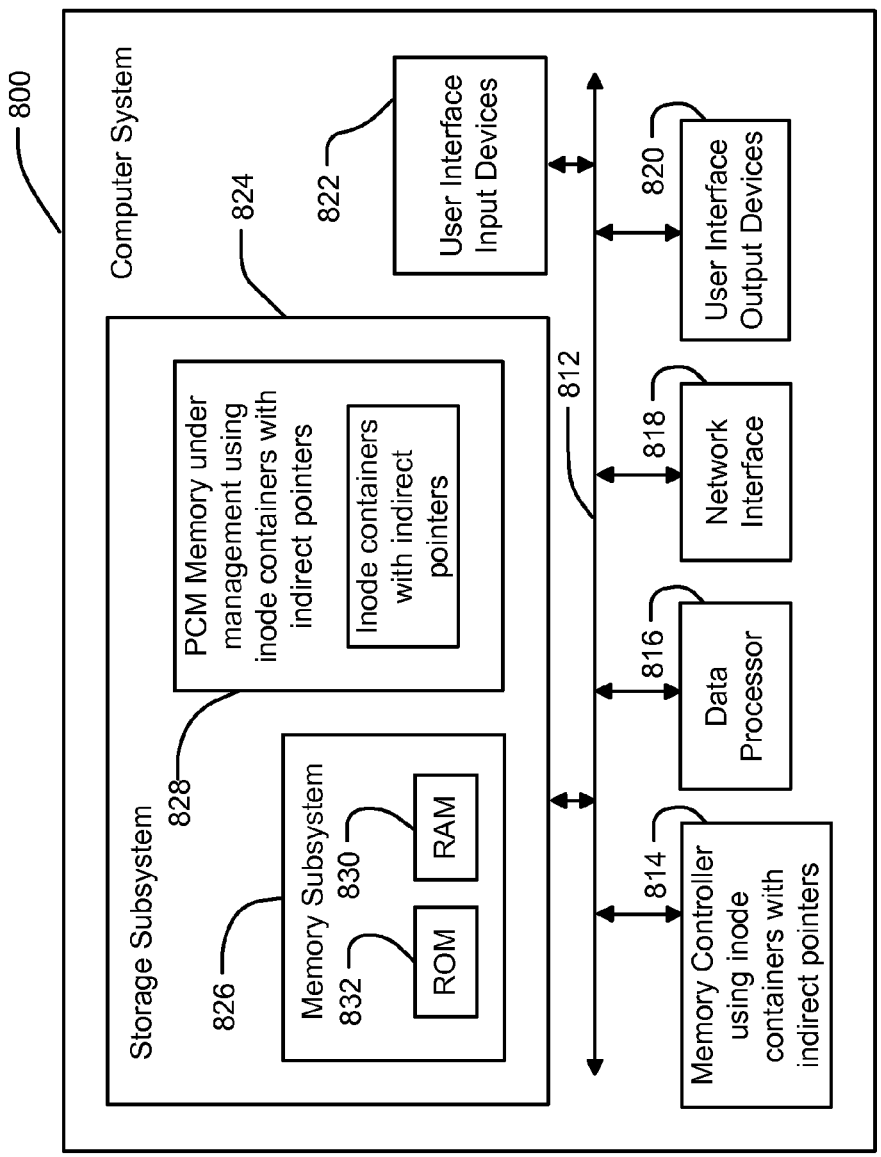
FIG. 8 is a block diagram of an example computer system.

FIG. 8 is a block diagram of an example computer system 800, according to one implementation. Computer system 800 can include a storage subsystem 824 including a memory 828 including a plurality of pages, and a memory controller 814 coupled to at least the memory 828. The memory 828 can be under memory management using inode containers with indirect pointers. The memory 828 may store inode containers as described herein The memory 828 may include phase change memory materials, like chalcogenides, and other programmable resistance materials. Phase change memory materials may include alloys of materials such as germanium (Ge), antimony (Sb), tellurium (Te), gallium (Ga), indium (In), silver (Ag), selenium (Se), thallium (Ti), bismuth (Bi), tin (Sn), copper (Cu), palladium (Pd), lead (Pb), sulfur (S), and gold (Au). Phase change materials include $Ge_xSb_xTe_x$ materials in general. Other programmable resistance memory can be used as well, including metal oxide memory, flash memory, electrolytic conductive bridge memory, and so on.

The memory controller 814 includes programs or other logic to perform memory management for a file system including a plurality of data objects. In particular, the memory controller 814 includes logic to store the data objects (e.g. inodes) in a plurality of containers that has addresses and includes addressable units of a memory, to map the objects (e.g. inodes) to addresses for corresponding containers in the plurality of containers, and to store indirect pointers (e.g. target pointers) in the containers, where the indirect pointer in a particular container points to the address of a container in the plurality of containers in which the corresponding object is stored. The memory controller 814 includes logic to store source pointers in the containers, where the source pointer in the particular container points to the address of the container in the plurality of containers to which the object stored in the particular container is mapped. The memory controller 814 includes logic to move an object stored in a first one of the containers to a second one of the containers, and to use the source pointer in the first one to find a third one to which the object is mapped. The memory controller 814 includes logic to update the indirect pointer in the third one to point to the second one, and updating the source pointer in the second one to point to the third one.

The memory controller 814 may include a metadata manager 125 including an endurance-aware management unit 126 (FIG. 1). The example computer system 800 and/or the memory controller 814 may include logic to perform other tasks as set forth in the description for the method for memory management for a file system including a plurality of data objects such as files, directories, inodes, etc.

The memory 828 may be on an integrated circuit, where the memory controller 814 includes logic on the integrated circuit. Computer system 800 may include a data processor 816, wherein the memory controller 814 includes logic on the data processor 816. For example, the logic may include algorithms such as Algorithm 1 described herein.

The data processor 816 communicates with a number of peripheral devices via bus subsystem 812. These peripheral devices may include the storage subsystem 824 including, for example, memory devices such as ROM and RAM, and the memory 828 with wear leveling, user interface input devices 822, user interface output devices 820, and a network interface subsystem 818. The input and output devices allow user interaction with computer system 800. Network interface subsystem 818 provides an interface to outside networks.

User interface input devices 822 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 800.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as via audio output devices. In general, use of the term "output device" is intended to include all possible types of devices and ways to output information from computer system 800 to the user or to another machine or computer system.

Storage subsystem 824 stores programming and data constructs that provide the functionality of some or all of the modules and methods described herein. These software modules are generally executed by data processor 816 alone or in combination with other processors.

Memory subsystem 826 used in the storage subsystem 824 can include a number of memories including a main random access memory (RAM) 830 for storage of instructions and data during program execution and a read only memory (ROM) 832 in which fixed instructions are stored. The storage subsystem 824 can provide persistent storage for program and data files, and may include a hard disk drive, a floppy disk drive along with associated removable media, a CD-ROM drive, an optical drive, or removable media cartridges. The modules implementing the functionality of certain implementations may be stored in the storage subsystem 824, or in other machines accessible by the processor.

Bus subsystem 812 provides a mechanism for letting the various components and subsystems of computer system 800 communicate with each other as intended. Although bus subsystem 812 is shown schematically as a single bus, alternative implementations of the bus subsystem may use multiple busses.

Computer system 800 can be of varying types including a workstation, server, computing cluster, blade server, server farm, or any other data processing system or computing device. Due to the ever-changing nature of computers and networks, the description of computer system 800 depicted in FIG. 8 is intended only as one example. Many other configurations of computer system 800 are possible having more or fewer components than the computer system depicted in FIG. 8.

The present technology is applicable to file systems including the EXT2/EXT3 file systems. The present technology is applicable to phase change memory, magnetic random access memory, and resistive random access memory. Although the present specification uses inodes as an example of data objects, the present technology is also applicable to data objects that contain other types of metadata. For instance, the present technology is applicable to the File Allocation Table (FAT) in the FAT file system, and the Master File Table (MFT) of the New Technology File System (NTFS).

The present technology can utilize a hash mechanism for the purposes of mapping data objects to containers.

The present technology can be implemented in computer hardware, software, or firmware that has access to data objects such as metadata of a file system. The computer hardware, software, or firmware can include MMU, CPU, and reusable hardware design units including intellectual property (IP) cores.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for memory management, comprising:
   storing data objects in a plurality of containers having addresses;
   mapping the data objects to addresses for corresponding containers in the plurality of containers, so that the data objects are mapped to the addresses of respective containers in the plurality of containers;
   storing indirect pointers in the containers, the indirect pointer in a particular container in the plurality of containers pointing to the address of a second container in the plurality of containers in which the data object mapped to the address of the particular container is stored;
   storing source pointers in the containers, the source pointer in the particular container pointing to the address of a third container in the plurality of containers to which the data object stored in the particular container is mapped; and
   finding the data object mapped to the address of the particular container and stored in the second container by accessing the particular container, and reading the indirect pointer in the particular container to access the particular data object,
   wherein each of the particular container, the second container and the third container stores a data object, an indirect pointer and a source pointer, and the source pointer in the second container points to the particular container.

2. The method of claim 1, including moving a data object stored in a first one of the containers to a second one of the containers, the data object being mapped to a third one of the containers, and using the source pointer in the first one to find the third one, updating the indirect pointer in the third one to point to the second one, and updating the source pointer in the second one to point to the third one.

3. The method of claim 1, including swapping a first data object stored in a first one of the containers with a second data object stored in a second one of the containers, the first data object being mapped to a third one of the containers and the second data object being mapped to a fourth one of the containers, using the source pointer in the first one to find the third one, using the source pointer in the second one to find the fourth one, updating the indirect pointer in the third one to point to the container that is pointed to by the indirect pointer of the fourth one, updating the indirect pointer in the fourth one to point to the container that was pointed to by the indirect pointer of the third one before the indirect pointer of the third one is updated, updating the source pointer in the second one to point to the third one, and updating the source pointer in the first one to point to the fourth one.

4. The method of claim 1, including moving data objects among the containers in the plurality of containers according to usage patterns in the memory without changing the mapping.

5. An apparatus, comprising:
   a memory including a plurality of data objects; and
   a memory controller coupled to the memory, including logic to store the data objects in a plurality of containers having addresses; logic to map the data objects to addresses for corresponding containers in the plurality of containers, so that the data objects are mapped to the addresses of a respective containers in the plurality of containers; logic to store indirect pointers in the containers, the indirect pointer in a particular container in the plurality of containers pointing to the address of a second container in the plurality of containers in which the data object mapped to the address of the particular container is stored; logic to store source pointers in the containers, the source pointer in the particular container pointing to the address of a third container in the plurality of containers to which the data object stored in the particular container is mapped; and logic to find the data object mapped to the address of the particular container and stored in the second container by accessing the particular container, and to read the indirect pointer in the particular container to access the particular data object, wherein each of the particular container, the second container and the third container stores a data object, an indirect pointer and a source pointer, the source pointer in the second container points to the particular container.

6. The apparatus of claim 5, wherein the memory controller includes logic to move a data object stored in a first one of the containers to a second one of the containers, the data object being mapped to a third one of the containers; logic to use the source pointer in the first one to find the third one; logic to update the indirect pointer in the third one to point to the second one; and logic to update the source pointer in the second one to point to the third one.

7. The apparatus of claim 5, wherein the memory controller includes logic to swap a first data object stored in a first one of the containers with a second data object stored in a second one of the containers, the first data object being mapped to a third one of the containers and the second data object being mapped to a fourth one of the containers; logic to use the source pointer in the first one to find the third one, and to use the source pointer in the second one to find the fourth one; logic to update the indirect pointer in the third one to point to the container that is pointed to by the indirect pointer of the fourth one, and to update the indirect pointer in the fourth one to point to the container that was pointed to by the indirect pointer of the third one before the indirect pointer of the third one is updated; and logic to update the source pointer in the second one to point to the third one, and update the source pointer in the first one to point to the fourth one.

8. The apparatus of claim 5, wherein the memory controller includes logic to move data objects among the containers in the plurality of containers according to usage patterns in the memory without changing the mapping.

9. A method for memory management, comprising:
storing data objects in a plurality of containers having addresses and comprising addressable units of a physical memory;
mapping the data objects to addresses for corresponding containers in the plurality of containers, so that the data objects are mapped to the addresses of respective containers in the plurality of containers;
using indirect pointers to access the data objects, the indirect pointer in a particular container in the plurality of containers pointing to the address of a second container in the plurality of containers in which the data object mapped to the address of the particular container is stored;
moving the data objects and updating the indirect pointers according to a wear leveling protocol for the physical memory;
storing source pointers in the containers, the source pointer in the particular container pointing to the address of a third container in the plurality of containers to which the data object stored in the particular container is mapped; and
finding the data object mapped to the address of the particular container and stored in the second container by accessing the particular container, and reading the indirect pointer in the particular container to access the particular data object,
wherein each of the particular container, the second container and the third container stores a data object, an indirect pointer and a source pointer, the source pointer in the second container points to the particular container.

10. The method of claim 9, including storing the indirect pointers in the physical memory.

11. The method of claim 9, including storing the indirect pointers in the containers.

* * * * *